(12) United States Patent
Atkins

(10) Patent No.: US 12,394,444 B2
(45) Date of Patent: Aug. 19, 2025

(54) COMPUTING DYNAMIC METADATA FOR EDITING HDR CONTENT

(71) Applicant: Dolby Laboratories Licensing Corporation, San Francisco, CA (US)

(72) Inventor: Robin Atkins, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 137 days.

(21) Appl. No.: 17/928,926

(22) PCT Filed: Jun. 2, 2021

(86) PCT No.: PCT/US2021/035402
§ 371 (c)(1),
(2) Date: Nov. 30, 2022

(87) PCT Pub. No.: WO2021/247670
PCT Pub. Date: Dec. 9, 2021

(65) Prior Publication Data
US 2023/0230617 A1    Jul. 20, 2023

Related U.S. Application Data

(60) Provisional application No. 63/034,006, filed on Jun. 3, 2020.

(30) Foreign Application Priority Data

Jun. 3, 2020   (EP) ..................... 20178044

(51) Int. Cl.
*G11B 27/031*  (2006.01)
*G06T 5/70*  (2024.01)
*H04N 7/01*  (2006.01)

(52) U.S. Cl.
CPC .............. *G11B 27/031* (2013.01); *G06T 5/70* (2024.01); *H04N 7/01* (2013.01); *G06T 2207/10016* (2013.01)

(58) Field of Classification Search
None
See application file for complete search history.

(56) References Cited

U.S. PATENT DOCUMENTS 7,043,090 B2   5/2006  Gindele
8,149,338 B2   4/2012  Rehm
(Continued)

FOREIGN PATENT DOCUMENTS

CN   105594204 A    5/2016
EP     3094096 B1   9/2018
(Continued)

OTHER PUBLICATIONS

Dolby: "Dolby Vision (TM) for the Home 2 what is Dolby Vision" Jan. 1, 2016.
(Continued)

*Primary Examiner* — Gelek W Topgyal

(57) ABSTRACT

A system and method of editing video content includes receiving input video data; converting the input video data to a predetermined format; generating a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content, wherein the first meta-data value, the second metadata value, and the third metadata value include information used by a decoder to render a decoded image on a display.

15 Claims, 10 Drawing Sheets

(56) References Cited

U.S. PATENT DOCUMENTS

| | | | |
|---|---|---|---|
| 9,584,786 B2 | 2/2017 | Atkins | |
| 10,242,627 B2 | 3/2019 | Farrell | |
| 10,389,948 B2 | 8/2019 | Nash | |
| 10,515,667 B2 | 12/2019 | De Haan | |
| 10,540,920 B2 | 1/2020 | Atkins | |
| 10,553,255 B2 | 2/2020 | Atkins | |
| 10,779,008 B2 | 9/2020 | Chen | |
| 10,880,557 B2* | 12/2020 | Dai | H04N 19/186 |
| 11,288,781 B2 | 3/2022 | Gadgil | |
| 2013/0243074 A1* | 9/2013 | Bai | H04L 69/04 |
| | | | 375/240 |
| 2013/0287361 A1 | 10/2013 | Teixeira | |
| 2016/0360212 A1 | 12/2016 | Dai | |
| 2017/0124983 A1* | 5/2017 | Atkins | G09G 5/10 |
| 2018/0018932 A1* | 1/2018 | Atkins | G09G 5/363 |
| 2018/0048845 A1 | 2/2018 | Kozuka | |
| 2018/0098094 A1* | 4/2018 | Wen | H04N 19/136 |
| 2019/0098196 A1 | 3/2019 | Bessou | |
| 2019/0272643 A1* | 9/2019 | Gadgil | G06T 7/11 |
| 2019/0356891 A1* | 11/2019 | Zhang | G09G 5/10 |
| 2020/0053334 A1* | 2/2020 | Oh | H04N 9/77 |
| 2020/0132996 A1* | 4/2020 | Yokota | G06F 3/013 |
| 2021/0084257 A1* | 3/2021 | Yuan | H04N 21/4363 |

FOREIGN PATENT DOCUMENTS

| | | | | |
|---|---|---|---|---|
| JP | 2016514395 A | 5/2016 | | |
| JP | 2016538736 A | 12/2016 | | |
| JP | 2019537320 A | 12/2019 | | |
| JP | 2020524446 A | 8/2020 | | |
| JP | 2021529339 A | 10/2021 | | |
| KR | 20110041528 A | 4/2011 | | |
| KR | 20150120993 A | 10/2015 | | |
| KR | 102004199 B1 | 7/2019 | | |
| RU | 2565601 C1 | 10/2015 | | |
| TW | 201234860 A | 8/2012 | | |
| TW | 201448568 A | 12/2014 | | |
| WO | 2014130343 | 8/2014 | | |
| WO | WO-2014130343 A2 * | 8/2014 | | G06T 5/007 |
| WO | 2015050857 A1 | 4/2015 | | |
| WO | WO-2016183234 A1 * | 11/2016 | | G06K 9/00711 |
| WO | WO-2016183239 A1 * | 11/2016 | | G06K 9/00711 |
| WO | 2017053852 A1 | 3/2017 | | |
| WO | 2018098096 A1 | 5/2018 | | |
| WO | 2018231968 A1 | 12/2018 | | |
| WO | WO-2019130626 A1 * | 7/2019 | | G09G 3/2096 |
| WO | 2019169174 A1 | 9/2019 | | |

OTHER PUBLICATIONS

Dolby: Dolby Vision Color Grading Best Practices Guide Dec. 16, 2019.

ITU: Recommendation ITU-R BT. 1886 "Reference Electro-Optical Transfer Function for Flat Panel Displays used in HDTV Studio Production BT Series Broadcasting Service" Mar. 31, 2011.

SMPTE: High Dynamic Range Electro-Optical Transfer Function of Mastering Reference Displays SMPTE ST 2084:Aug. 2014.

Wei, Zhen, et al "The Realization of Video Mixing Edit Method Based on DES" IEEE International Conference, Jul. 16, 2010.

* cited by examiner

COMPUTING DYNAMIC METADATA FOR EDITING HDR CONTENT

CROSS-REFERENCE TO RELATED APPLICATIONS

This application is the United States national stage entry of International Patent Application No. PCT/US2021/035402, filed Jun. 2, 2021, which claims priority to European Patent Application No. 20178044.2; and U.S. Provisional Application No. 63/034,006, both filed on Jun. 3, 2020, each of which is incorporated by reference in its entirety.

BACKGROUND

1. Field of the Disclosure

This application relates generally to images; more specifically, this application relates to generating metadata for display management in connection with video content.

2. Description of Related Art

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g., interchangeably.

As used herein, the term "high dynamic range" (HDR) relates to a DR breadth that spans the some 14-15 or more orders of magnitude of the HVS. In practice, the DR over which a human may simultaneously perceive an extensive breadth in intensity range may be somewhat truncated, in relation to HDR. As used herein, the terms "enhanced dynamic range" (EDR) or "visual dynamic range" (VDR) may individually or interchangeably relate to the DR that is perceivable within a scene or image by the HVS that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g. RGB, luma Y, and chroma Cb and Cr) where, in a quantized digital system, each color component is represented by a precision of n-bits per pixel (e.g., n=8). A bit depth of $n \leq 8$ (e.g., color 24-bit JPEG images) may be used with images of standard dynamic range (SDR), while a bit depth of $n>8$ may be considered for images of enhanced dynamic range (EDR) to avoid contouring and staircase artifacts. In addition to integer datatypes, EDR and high dynamic range (HDR) images may also be stored and distributed using high-precision (e.g., 16-bit) floating-point formats, such as the OpenEXR file format developed by Industrial Light and Magic.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata.

Many consumer desktop displays render non-HDR content at a maximum luminance of 200 to 300 $cd/m^2$ ("nits") and consumer high-definition and ultra-high definition televisions ("HDTV" and "UHD TV") from 300 to 500 nits. Such display output thus typify a low dynamic range (LDR), also referred to as SDR, in relation to HDR or EDR. As the availability of HDR or EDR content grows due to advances in both capture equipment (e.g., cameras) and HDR displays (e.g., the PRM-4200 professional reference monitor from Dolby Laboratories or the Sony Trimaster HX 31" 4K HDR Master Monitor), HDR content may be color graded and displayed on HDR displays that support higher dynamic ranges (e.g., from 700 nits to 5000 nits or more). Such displays may be defined using alternative EOTFs that support high luminance capability (e.g., 0 to 10,000 nits). An example of such an EOTF is defined in SMPTE ST 2084: 2014 "High Dynamic Range EOTF of Mastering Reference Displays," which is incorporated herein by reference in its entirety.

As used herein, the term "display management" denotes the processing (e.g., tone and gamut mapping) required to map an input video signal of a first dynamic range (e.g., 1000 nits) to a display of a second dynamic range (e.g., 500 nits). Examples of display management processes are described in PCT Application Ser. No. PCT/US2014/016304 (the '304 application), filed on Feb. 13, 2014, "Display management for high dynamic range video," by R. Atkins el at., which is incorporated herein by reference in its entirety. Display management may be assisted or controlled by input metadata generated by the source of the incoming content and multiplexed into the coded bitstream.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF SUMMARY OF THE DISCLOSURE

Various aspects of the present disclosure relate to devices, systems, and methods for the generation of metadata that may be used to provide improved video quality, improved temporal stability, low computational requirements, and reduced latency.

In one aspect of the present disclosure, there is provided a method of editing video content, comprising: receiving input video data; converting the input video data to a predetermined format, thereby to generate converted video data; generating a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content, wherein the first metadata value, the second metadata value, and the third metadata value include information used by a decoder to render a decoded image on a display.

In another aspect of the present disclosure, there is provided a video editing system, comprising: a memory; and a processor configured cause the video editing system to: receive input video data, convert the input video data to a predetermined format, thereby to generate converted video data, generate a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content.

In another aspect of the present disclosure, there is provided a method of editing video content, comprising: receiving input video data; converting the input video data to a predetermined format, thereby to generate converted video data; generating a first metadata value for a frame of the converted video data, the first metadata value corresponding to an average luminance value of the frame; determining a temporal window including the frame, the temporal window having a predetermined length in time; calculating a maximum metadata range and a minimum metadata range over the temporal window, thereby to generate a first filtered metadata value and a second filtered metadata value; and smoothing the first filtered metadata value and the second filtered metadata value, thereby to generate a first smoothed and filtered metadata value and a second smoothed and filtered metadata value.

In this manner, various aspects of the present disclosure effect improvements in at least the technical fields of video capturing, editing, and signal processing, as well as the related fields of video and other content delivery.

DESCRIPTION OF THE DRAWINGS

These and other more detailed and specific features of various embodiments are more fully disclosed in the following description, reference being had to the accompanying drawings, in which.

DETAILED DESCRIPTION

Figure 1:
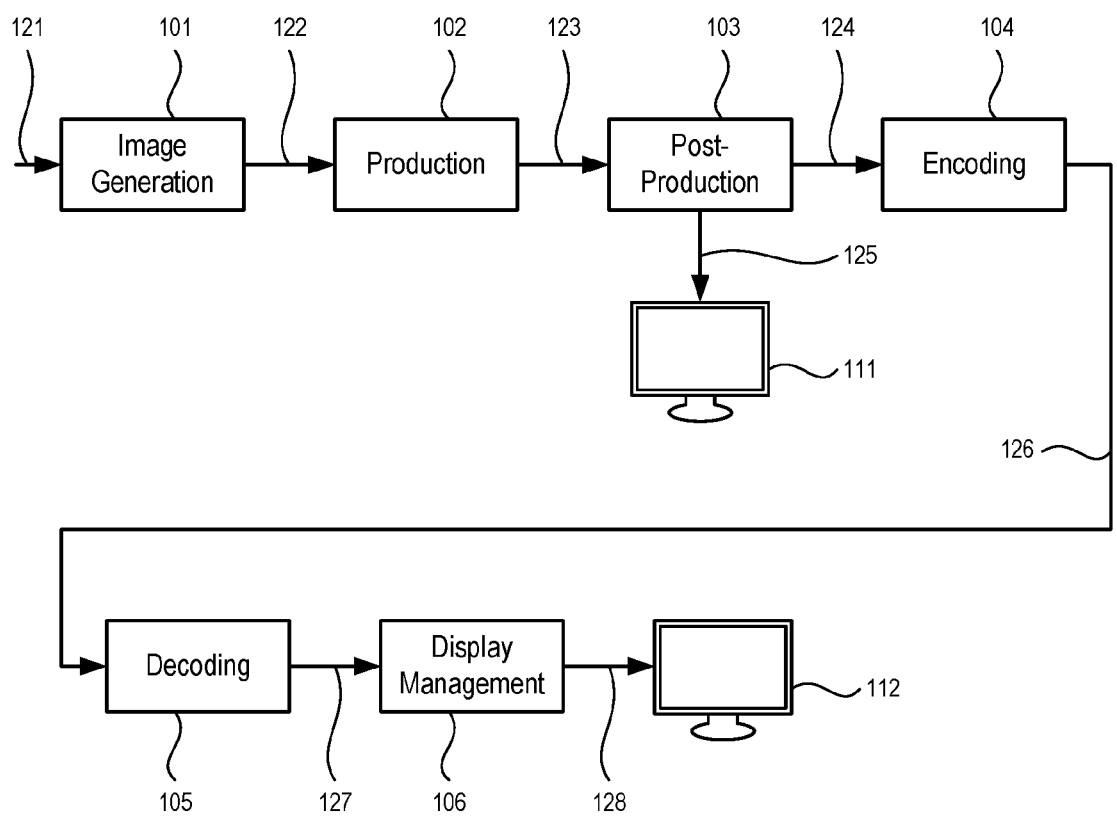
FIG. 1 illustrates an exemplary video delivery pipeline in accordance with various aspects of the present disclosure.

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in content generation, it will be understood that this is merely one example of an implementation. It will further be understood that the disclosed systems and methods can be used in any device in which there is a need to generate, modify, or display image data and/or associated metadata; for example, cinema, consumer and other commercial projection systems, smartphone and other consumer electronic devices, heads-up displays, virtual reality displays, and the like.

Metadata

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein, and may be collectively referred to as "image-forming metadata."

Such metadata may be divided or classified into different levels of metadata. In one particular example, where the present disclosure is implemented in the Dolby Vision architecture, the mapping metadata may include L0 metadata, L1 metadata, L2/L8 metadata, L3 parameters, L4 metadata, L11 metadata, and the like. In some examples, L0 metadata provides or describes information about a dynamic range of video data across the entire video content (i.e., across multiple shots and/or scenes). For example, the L0 metadata may include L0min and L0max, which respectively represent the minimum luminance and maximum luminance for the video content, respectively. In one particular example where the video content is HDR content, L0min and L0max may correspond to 0.01 nit and 1000 nit, respectively.

In some examples, L1 metadata provides or describes information about a distribution of luminance values in a source image, a source scene, a source group of pictures (GOP), and so on, as represented in the video data. The distribution of luminance values may be represented by histograms derived based on image content (e.g., pixel values, luma values, chroma values, Y values, Cb/Cr values, RGB values, etc.) of the image, the scene, the GOP, and so on. L1 metadata may include parameters L1min, L1mid, and L1max, which respectively represent the minimum luminance ("crush"), mid-tone luminance ("mid"), and maximum luminance ("clip") for one or more images, scenes, GOPS, etc., in the video content, respectively.

Other levels of metadata may also be defined. For example, L2 provides or describes information about video characteristic adjustments that are originated from, or traced back to, adjustments made by a director, a color grader, a video professional, and so on, in a production studio and/or during post-production. L8 metadata is similar to L2 metadata, and in some cases may be equivalent to L2 metadata (e.g., depending on the respective tone curves). L2 and L8 metadata may be referred to as "trim" parameters, and may be indicative of or related to the gain/offset/power of the image data. L2 metadata may correspond to a first reference display having a first reference dynamic range.

L3 metadata provides or describes information about video characteristic adjustments that are originated from, or traced back to, adjustments made by a director, a color grader, a video professional, and the like. As compared to L2 metadata, L3 metadata may correspond to a second reference display with a reference dynamic range different from the reference dynamic range of the first reference display. L3 metadata may include, for example, offsets or adjustments from the L1 metadata, including offsets or adjustments to the crush, mid, and/or clip luminance values.

L4 metadata provides or describes information about global dimming operations. L4 metadata may be calculated by an encoder during pre-processing, and may be calculated using RGB color primaries. In one example, the L4 metadata may include data which dictates a global backlight brightness level of a display panel on a per-frame basis. Other generated metadata, such as L11 metadata, may provide or describe information to be used to identify the source of the video data, such as cinematic content, computer game content, sports content, and the like. Such metadata may further provide or describe intended picture settings, such as intended white point, sharpness, and the like.

Taken together, the image-forming metadata may include conversion data for converting from a first dynamic range to a second dynamic range that is different from the first dynamic range. In some aspects of the present disclosure, the first dynamic range may be higher than the second dynamic range (e.g., conversion from HDR to SDR). In other aspects of the present disclosure, the second dynamic range may be higher than the first dynamic range (e.g., conversion from SDR to HDR).

Comparative methods of generating image-forming metadata may include calculating per-frame metadata (e.g., per-frame L1 metadata) and either applying IIR filtering (e.g., for live broadcast or games) or combining metadata into scenes by computing the min, mid, and max of a scene (e.g., for studio or professional offline content). However, neither of these methods allows for instant preview of content during editing. For example, a user may want to make an HDR picture brighter, and preview the result on an SDR monitor as a reference display. To do so, the following steps occur: adjustment is applied to the HDR picture; L1 metadata is recalculated for the adjusted HDR picture; tone mapping operations are modified; and adjusted tone mapping is applied to the adjusted HDR picture to produce the SDR preview picture.

This set of operations may be satisfactory if applied to a single image, as a single image can reasonably be stored in a memory so the operations may be applied in quick succession. However, the L1 metadata (and thus the resulting tone curve) may vary significantly from frame to frame, causing the mapped image to flicker. This may be referred to as "temporal instability." To ensure temporal stability of the tone curve, some filtering may be performed. However, if the metadata recalculation operation depends on multiple images, then the adjustment operation and the metadata recalculation operation must be applied to many images, which may be impractical or impossible at fast video rates.

Thus, comparative methods of generating image-forming metadata may result in slowdown to the iterative cycle of adjusting, updating, and previewing the results. Moreover, the IIR filtering comparative method may require a very large number of frames to be analyzed prior to a current frame, because the current frame requires all previous frames for the IIR filter. The studio or professional comparative method requires all the frames of a scene, which in some cases may have a length on the order of minutes or even hours.

In view of this, various aspects of the present disclosure provide for methods of generating metadata for efficient editing; that is, editing that results in high image quality and high temporal stability. Various aspects of the present disclosure may accomplish such editing with low computational requirements and low or no latency. In some aspects, the methods of generating metadata are incorporated into or used with a video delivery pipeline.

Video Delivery Pipeline

FIG. 1 illustrates an exemplary video delivery pipeline, and shows various stages from video capture to video content display. Moreover, while the following description is provided in terms of video (i.e., moving images), the present disclosure is not so limited. In some examples, the image content may be still images or combinations of video and still images. The image content may be represented by raster (or pixel) graphics, by vector graphics, or by combinations of raster and vector graphics. FIG. 1 illustrates an image generation block 101, a production block 102, a post-production block 103, an encoding block 104, a decoding block 105, and a display management block 106. The various blocks illustrated in FIG. 1 may be implemented as or via hardware, software, firmware, or combinations thereof. Moreover, various groups of the illustrated blocks may have their respective functions combined, and/or may be performed in different devices and/or at different times. Individual ones or groups of the illustrated blocks may be implemented via circuitry including but not limited to central processing units (CPUs), graphics processing units (GPUs), ASICs, FPGAs, and combinations thereof. The operations performed by one or more of the blocks may be processed locally, remotely (e.g., cloud-based), or a combination of locally and remotely.

As illustrated in FIG. 1, the video delivery pipeline further includes a reference display 111, which may be provided to assist with or monitor the operations conducted at the post-production block 103, and a target display 112. For explanation purposes, the image generation block 101, the production block 102, the post-production block 103, and the encoding block 104 may be referred to as "upstream" blocks or components, whereas the decoding block 105 and the display management block 106 may be referred to as "downstream" blocks or components.

In the example illustrated in FIG. 1, video content in the form of a sequence of video frames 121 is captured or generated at the image generation block 101. The video frames 121 may be digitally captured (e.g. by a digital camera) or generated by a computer (e.g. using computer animation) to generate video data 122. Alternatively, the video frames 121 may be captured on film by a film camera and then converted to a digital format to provide the video data 122. In either case, the video data 122 is provided to the production block 102, where it is edited to provide a production stream 123. The video frames 121 may be grouped into sequences, such as shots and scenes. A shot is, for example, a set of temporally-connected frames. Shots may be separated by "shot cuts" (e.g., timepoints at which the whole content of the image changes instead of only a part of it). A scene is, for example, a sequence of shots that describe a storytelling segment of the larger content. In one particular example where the video content is an action movie, the video content may include (among others) a chase scene which in turn includes a series of shots (e.g., a shot of a driver of a pursuing vehicle, a shot of the driver of a pursued vehicle, a shot of a street where the chase takes place, and so on).

The video data in the production stream 123 is then provided to a processor or processors at the post-production block 103 for post-production editing. Editing performed at the post-production block 103 may include adjusting or modifying colors or brightness in particular areas of an image to enhance the image quality or achieve a particular appearance for the image in accordance with the video creator's (or editor's) creative intent. This may be referred to as "color timing" or "color grading." Other editing (e.g., scene selection and sequencing, image cropping, addition of computer-generated visual special effects or overlays, etc.) may be performed at the post-production block 103 to yield a distribution stream 124. In some examples, the post-production block 103 may provide an intermediate stream 125 to the reference display 111 to allow images to be viewed on the screen thereof, for example to assist in the editing process. One, two, or all of the production block 102, the post-production block 103, and the encoding block 104 may further include processing to add metadata to the video data. This further processing may include, but is not limited to, a statistical analysis of content properties. The further processing may be carried out locally or remotely (e.g., cloud-based processing).

Following the post-production operations, the distribution stream 124 may be delivered to the encoding block 104 for downstream delivery to decoding and playback devices such as television sets, set-top boxes, movie theaters, laptop computers, tablet computers, and the like. In some examples, the encoding block 104 may include audio and video encoders, such as those defined by Advanced Television Systems Committee (ATSC), Digital Video Broadcasting (DVB), Digital Versatile Disc (DVD), Blu-Ray, and other delivery formats, thereby to generate a coded bitstream 126. In a receiver, the coded bitstream 126 is decoded by the decoding unit 105 to generate a decoded signal 127 representing an identical or close approximation of the distribution stream 124. The receiver may be attached to the target display 112, which may have characteristics which are different than the reference display 111. Where the reference display 111 and the target display 112 have different characteristics, the display management block 106 may be used to map the dynamic range or other characteristics of the decoded signal 127 to the characteristics of the target display 112 by generating a display-mapped signal 128. The display management block 106 may additionally or alternatively be used to provide power management of the target display 112.

The target display 112 generates an image using an array of pixels. The particular array structure depends on the architecture and resolution of the display. For example, if the target display 112 operates on an LCD architecture, it may include a comparatively-low-resolution backlight array (e.g., an array of LED or other light-emitting elements) and a comparatively-high-resolution liquid crystal array and color filter array to selectively attenuate white light from the backlight array and provide color light (often referred to as dual-modulation display technology). If the target display 112 operates on an OLED architecture, it may include a high-resolution array of self-emissive color pixels.

The link between the upstream blocks and the downstream blocks (i.e., the path over which the coded bitstream 126 is provided) may be embodied by a live or real-time transfer, such as a broadcast over the air using electromagnetic waves or via a content delivery line such as fiber optic, twisted pair (ethernet), and/or coaxial cables. In other examples, the link may be embodied by a time-independent transfer, such as recording the coded bitstream onto a physical medium (e.g., a DVD or hard disk) for physical delivery to an end-user device (e.g., a DVD player). The decoder block 105 and display management block 106 may be incorporated into a device associated with the target display 112; for example, in the form of a Smart TV which includes decoding, display management, power management, and display functions. In some examples, the decoder block 105 and/or display management block 106 may be incorporated into a device separate from the target display 112; for example, in the form of a set-top box or media player.

The decoder block 105 and/or the display management block 106 may be configured to receive, analyze, and operate in response to the metadata included or added at the upstream blocks. Such metadata may thus be used to provide additional control or management of the target display 112. The metadata may include the image-forming metadata described above (e.g., Dolby Vision metadata). The metadata may be generated at the post-production block 103 with the use of the reference display 111 and the production stream 123 and/or the intermediate stream 125.

Semi-Dynamic Metadata Generation

Figure 2:
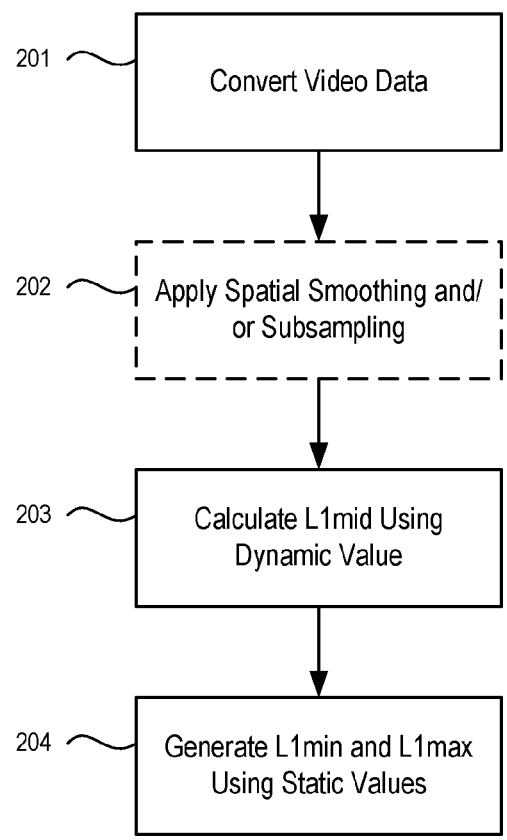
FIG. 2 illustrates a process flow for an exemplary metadata generation method according to various aspects of the present disclosure.

The image-forming metadata may be generated using a "semi-dynamic" method, an example of which is illustrated in FIG. 2. The operations illustrated in FIG. 2 may be performed automatically through the use of hardware, software, firmware, or combinations thereof associated with the post-production block 103 of FIG. 1.

As illustrated in FIG. 2, the semi-dynamic metadata generation process may begin at operation 201, in which a video signal is converted to a predetermined format (e.g., a particular EOTF). For example, the video signal may be converted from a Hybrid Log-Gamma (HLG) or SLOG-3 HDR to RGB Perceptual Quantizer (PQ) HDR, for example, as described in Rec. ITU-R BT.2100-1 (June 2017). In some implementations, at operation 202, a spatial smoothing and/or subsampling may be applied. Operation 202 may be implemented using a 2D smoothing kernel (e.g., [1 1]/2 or [1 3 3 1]/8). This reduces the sensitivity to individual pixels. In some examples, the image may be decimated to a smaller size (e.g., half size) after filtering. In other implementations, operation 202 may be omitted and the semi-dynamic metadata generation process may proceed directly from operation 201 to operation 203. At operation 203, initial values of L1mid are calculated (e.g., on a per-frame basis). For example L1mid may represent the average value of the maximum RGB luminance. With other words L1mid may represent the average value of the maximum of the color component values R, G, B for each pixel. The values of L1min and L1max are not calculated from the content, instead, at operation 204 fixed values are used that correspond to the minimum and maximum allowable range of the image content, as represented in L0 metadata (e.g., Level0.Smin and Level0.Smax). For example L1mid may represent the average luminance value of the Y component values when a YCbCr representation is used.

As one particular example of the operations of FIG. 2, the following pseudocode is presented using a MATLAB-like format:

```
% Convert to PQ (example of operation 201)
if strcmpi(SEOTF,'HLG')
    imPQ = L2PQ(HLG2L(im,SMax,Smin));
else
    imPQ = im;
end
% Subsample 50% (example of operation 202)
imPQHalf = Half(imPQ);
% Calculate per-pixel metadata (example of operation 203, 204)
maxRGB = max(imPQHalf,[ ],3);
L1Min = L2PQ(MD{n}.Level0.Smin);
L1Mid = mean(MAXRGB(:));
L1Max = L2PQ(MD{n}.Level0.Smax);
```

Figure 3:
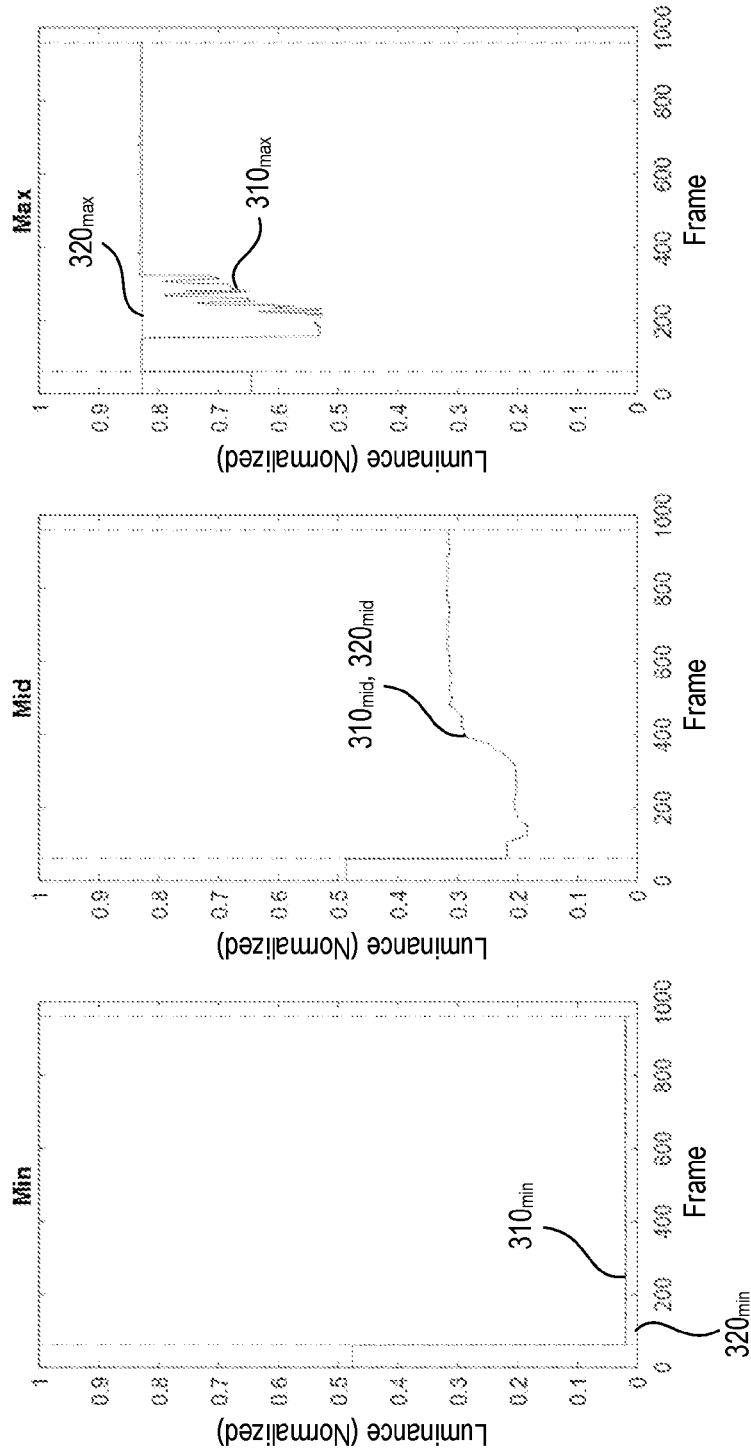
FIG. 3 illustrates exemplary metadata generated by the method of FIG. 2.

FIG. 3 illustrates an exemplary output of the above operations for metadata corresponding to the crush, mid, and clip values. Each graph illustrates a normalized luminance as a function of a frame number. Lines $310_{min}$, $310_{mid}$, and $310_{max}$ illustrate the minimum, mean, and maximum luminance values of a given frame, respectively. Lines $320_{min}$, $320_{mid}$, and $320_{max}$ illustrate the values L1min, L1mid, and L1max for the given frame.

Because L1min and L1max are set to the values of L0min and L0max, respectively, the crush and clip metadata values do not strictly match the actual luminance values for all frames. In the particular example illustrated in FIG. 3, the minimum per-frame luminance value (line $310_{min}$) varies between approximately 0.01 and 0.48, while the value L1min (line $320_{min}$) is set to approximately 0. The maximum per-frame luminance value (line $310_{max}$) varies between approximately 0.53 and 0.82, while the value L1max (line $320_{max}$) is set to approximately 0.82. However, because L1mid is determined by a dynamic value, the mid metadata value closely matches the actual luminance value for all frames. As illustrated in FIG. 3, the average per-frame luminance value (line $310_{mid}$) and the value L1mid (line $320_{mid}$) have a high correspondence.

The semi-dynamic generation of metadata requires processing of a single frame only. This method results in high efficiency; however, as can be seen from FIG. 3 the use of static values of the crush and clip metadata values results in a slightly lower mapped image contrast for images that do not use the full dynamic range of the container.

Dynamic Metadata Generation

Figure 4:
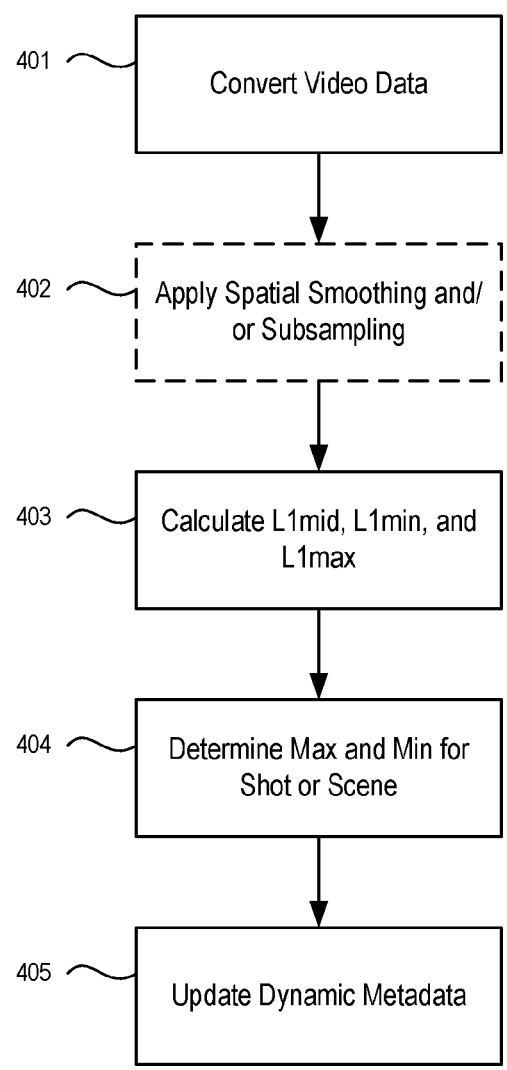
FIG. 4 illustrates a process flow for another exemplary metadata generation method according to various aspects of the present disclosure.

The image-forming metadata may be generated using a "dynamic" method, an example of which is illustrated in FIG. 4. The operations illustrated in FIG. 4 may be performed automatically through the use of hardware, software, firmware, or combinations thereof associated with the post-production block 103 of FIG. 1.

As illustrated in FIG. 4, the dynamic metadata generation process may begin at operation 401, in which a video signal is converted to a predetermined format (e.g., a particular EOTF). For example, the video signal may be converted from an HLG or SLOG-3 HDR to RGB PQ HDR, for example, as described in Rec. ITU-R BT.2100-1 (June 2017). In some implementations, at operation 402, a spatial smoothing and/or subsampling may be applied. Operation 402 may be implemented using a 2D smoothing kernel (e.g., [1 1]/2 or [1 3 3 1]/8). This reduces the sensitivity to individual pixels. In some examples, the image may be decimated to a smaller size (e.g., half size) after filtering. In other implementations, operation 402 may be omitted and the semi-dynamic metadata generation process may proceed directly from operation 401 to operation 403. At operation 403, initial values of L1min, L1mid, and L1max are calculated (e.g., on a per-frame basis). For example, L1min may represent the minimum value of the RGB luminance, L1mid may represent the average value of the maximum RGB luminance, and L1max may represent the maximum value of the RGB luminance.

Subsequently, at operation 404, the values of L1min and L1max are recalculated using dynamic values for the given shot or scene. For example, each frame of the shot or scene may be analyzed to determine the minimum and maximum RGB luminance across the given shot or scene. At operation 405, the values of L1min and L1max are recalculated using a value which corresponds to the clip-wide minimum and maximum determined in operation 404. Compared with the semi-dynamic method described above, the dynamic method may more closely correspond to the image data because L1min and L1max are determined with regard to the actual minimum and maximum RGB luminance of the content, rather than the allowable (i.e., possible) minimum and maximum RGB luminance of the content.

As one particular example of the operations of FIG. 4, the following pseudocode is presented using a MATLAB-like format:

```
% Convert to PQ (example of operation 401)
if strcmpi(SEOTF,'HLG')
    imPQ = L2PQ(HLG2L(im,SMax,Smin));
else
    imPQ = im;
end
% Subsample 50% (example of operation 402)
imPQHalf = Half(imPQ);
% Calculate per-pixel metadata (example of operation 403)
maxRGB = max(imPQHalf,[ ],3);
L1Min = min(imPQHalf(:));;
L1Mid = mean(MAXRGB(:));
L1Max = max(imPQHalf(:));
% Determine max and min of whole clip (example of operation 404)
minPQ = 1;
maxPQ = 0;
for n=1:N
    if L1Min(n) < minPQ
        minPQ = L1Min(n)
    end
    if L1Max(n) > maxPQ
        maxPQ = L1Max(n)
    end
end
% Update dynamic metadata (example of operation 405)
for n=1:N
    fprintf('Updating Metadata for Frame %d of %d/n',n,N);
    NewMinF(n) = minPQ;
    NewMidF(n) = L1Mid(n);
    NewMaxF(n) = maxPQ;
end
```

Figure 5:
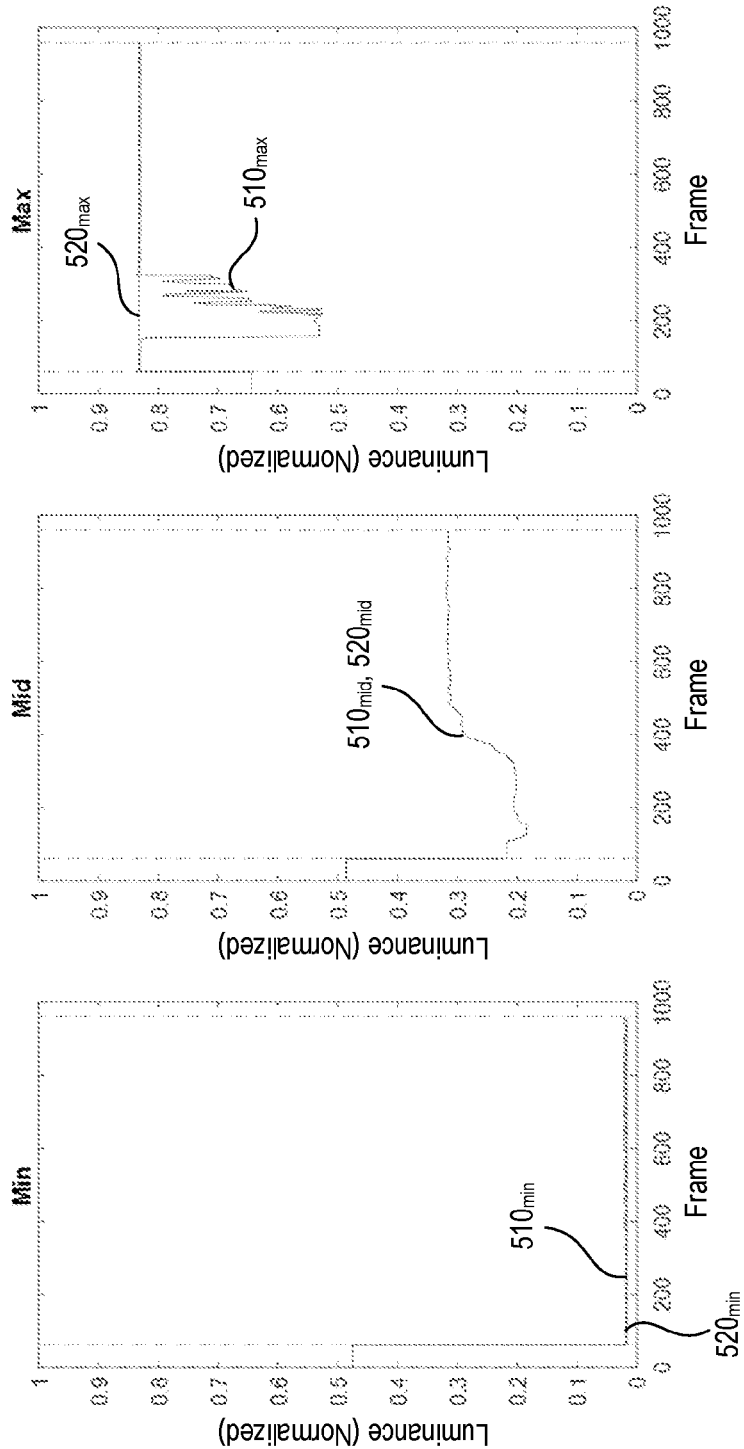
FIG. 5 illustrates exemplary metadata generated by the method of FIG. 2.

FIG. 5 illustrates an exemplary output of the above operations for metadata corresponding to the above operations for metadata corresponding to the crush, mid, and clip values. Each graph illustrates a normalized luminance as a function of a frame number. Lines $510_{min}$, $510_{mid}$, and $510_{max}$ illustrate the minimum, mean, and maximum luminance values of a given frame, respectively. Lines $520_{min}$, $520_{mid}$, and $520_{max}$ illustrate the values of L1min, L1mid, and L1max for the given frame.

Because L1min and L1max are set to the minimum values across all frame of the clip, the crush and clip metadata values do not strictly match the actual luminance values for all frames. However, as compared to the semi-dynamic method described above, the crush and clip metadata values are more closely matched with the actual luminance values. In the particular example illustrated in FIG. 5, the minimum per-frame luminance value (line $510_{min}$) varies between approximately 0.02 and 0.48, while the value L1min (line $510_{min}$) is set to approximately 0.02. By comparison, in the semi-dynamic method as illustrated in FIG. 3, the value L1min (line $310_{min}$) was set to 0. The maximum per-frame luminance value (line $510_{max}$) varies between approximately 0.53 and 0.82, while the value L1max (line $520_{max}$) is set to approximately 0.82. As above, because L1mid is determined by a dynamic value, the mid metadata value closely matches the actual luminance value for all frames. As illustrated in FIG. 5, the average per-frame luminance value (line $510_{mid}$) and the value L1mid (line $520_{mid}$) have a high correspondence.

The dynamic generation of metadata requires processing of all frames in a given shot or scene, and thus may result in higher computational requirements compared to the semi-dynamic generation of metadata. However, as can be seen from FIG. 5 the use of dynamic values of the crush and clip metadata values does not suffer from the same type of mapped image contrast reduction for images that do not use the full dynamic range of the container.

Windowed FIR Metadata Generation

Figure 6:
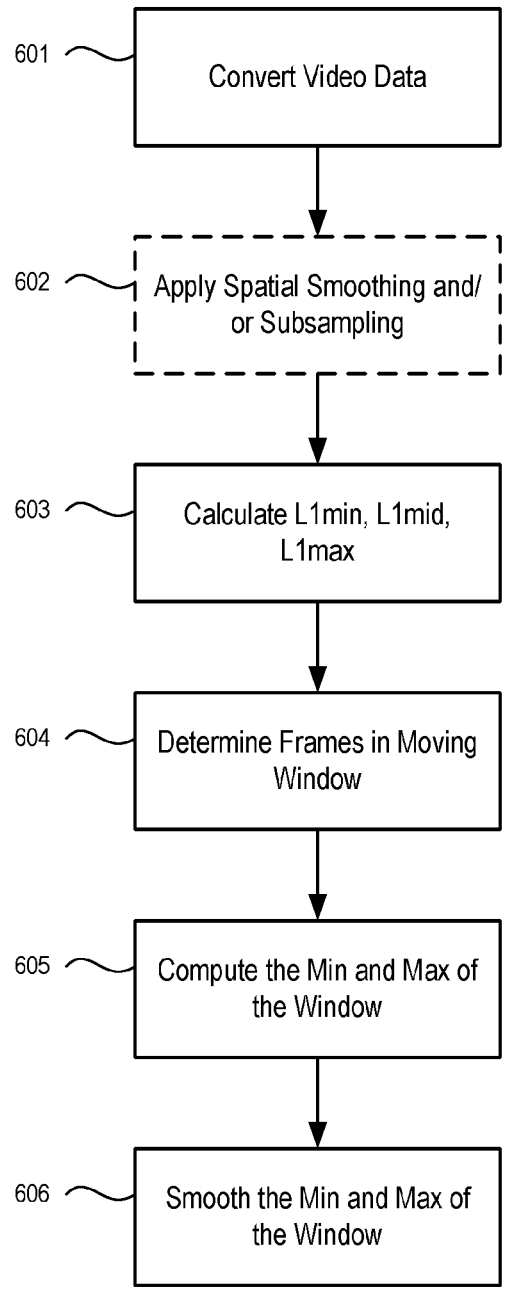
FIG. 6 illustrates a process flow for another exemplary metadata generation method according to various aspects of the present disclosure.

The image-forming metadata may be generated using a "windowed" method, an example of which is illustrated in FIG. 6. The operations illustrated in FIG. 6 may be performed automatically through the use of hardware, software, firmware, or combinations thereof associated with the post-production block 103 of FIG. 1.

As illustrated in FIG. 6, the windowed metadata generation process may begin at operation 601, in which av video signal is converted to a predetermined format (e.g., a particular EOTF). For example, the video signal may be converted from HLG or SLOG-3 HDR to RGB PQ HDR, for example, as described in Rec. ITU-R BT.2100-1 (June 2017). Thereafter, at operation 602, spatial smoothing and/or subsampling are applied. Operation 402 may be implemented using a 2D smoothing kernel (e.g., [1 1]/2 or [1 3 3 1]/8). This reduces the sensitivity to individual pixels. In some examples, the image may be decimated to a smaller size (e.g., half size) after filtering. At operation 603, initial values of L1min, L1mid, and L1max are calculated (e.g., on a per-pixel basis). For example, L1min may represent the minimum value of the minimum RGB luminance, L1mid may represent the average value of the maximum RGB luminance, and L1max may represent the maximum value of the maximum RGB luminance.

Subsequently, at operation 604, a list of frames in the moving window (k) is determined. This may be specified as a maximum length in time T multiplied by the frame rate. The time window T (also referred to as a "temporal" window) may be configurable by the operator. In some examples, the time window T is configurable between 0.4 seconds and 8 seconds. In one particular example, the time window T is 4 seconds. As will be described in more detail below, the particular value of the time window T is selected to balance temporal stability and picture quality; for example, shorter windows may introduce a degree of flicker whereas longer windows may result in a more static process. The window itself, however, is configured so that it does not cross scene cuts and is thus bounded by the first and last frame of the current scene.

Operation 605 is a first pass, in which the minimum and maximum of the window are calculated. For example, for each frame f in the moving window k, operation 605 may smooth the metadata using a 1D smoothing kernel such as [1 1]/2, [1 2 1]/4, [1 3 3 1]/8, or [1 3 8 3 1]/16, thereby to obtain a smoothed metadata L1minS(f) and L1maxS(f). This reduces the sensitivity to individual frames. Thereafter, operation 605 may determine a maximum metadata range over the moving window k; for example by computing L1minM(f)=min(L1minS(k)) (i.e., the minimum smoothed minimum metadata value) and L1maxM(f)=max(L1max(S (k)) (i.e., the maximum smoothed maximum metadata value).

Operation 606 is a second pass, in which the minimum and maximum of the window are smoothed. For example, operation 606 may calculate a smoothing filter F as a gaussian shape with L taps and a standard deviation s=L/6, and then for each frame f in the moving window k may smooth the filtered metadata calculated in operation 605 with the smoothing filter F to obtain smoothed and filtered metadata values L1minF and L1maxF. Operation 606 may also, for each frame f, set L1min and L1max to the smoothed and filtered metadata values and set L1mid to its initial value determined in operation 603.

Because operations 605 and 606 are applied to a moving window of frames, operations 604, 605, and 606 may be repeated so that all possible windows within a given scene are processed.

As one particular example of the operations of FIG. 6, the following pseudocode is presented using a MATLAB-like format:

```
% Convert to PQ (example of operation 601)
if strcmpi(SEOTF,'HLG')
    imPQ = L2PQ(HLG2L(im,SMax,Smin));
else
    imPQ = im;
end
% Subsample 50% (example of operation 602)
imPQHalf = Half(imPQ);
% Calculate per-pixel metadata (example of operation 603)
maxRGB = max(imPQHalf,[ ],3);
L1Min = min(imPQHalf(:));
L1Mid = mean(MAXRGB(:));
L1Max = max(imPQHalf(:));
% Modify for windowed metadata (example of operations 604, 605)
for n=1:N
    fprintf('Updating Metadata for Frame %d of %d/n',n,N);
    % Extract local window (example of operation 604)
    kmin = n−FIRWindow/2;
    kmax = n+FIRwindow/2;
    klastscenecut = SceneCuts(find(n>=SceneCuts,1,'last'));
    kmin = max(kmin, klastscenecut);
    knextscenecut = SceneCuts(find(n<SceneCuts,1,'first'));
    if ~isempty(knextscenecut)
        kmax = min(kmax, knextscenecut−1);
    end
    %Compute scene mid and max (example of operation 605)
    padding = [[1 1]*k(1) k [1 1]*k(end)];
    L1MinF = conv(L1Min(padding),[1 3 8 3 1]/16,'valid');
    L1MaxF = conv(L1Max(padding), [1 3 8 3 1]/16,'valid');
    WindowedMin(n) = min(L1MinF);
    WindowedMax(n) = max(L1MaxF);
end
% Smoothing (example operation 606)
for n=1:N
    fprintf('Updating Metadata for Frame %d of %d/n',n,N);
    % Extract local window (example of operation 604)
    kmin = n−FIRWindow/2;
    kmax = n+FIRwindow/2;
    klastscenecut = SceneCuts(find(n>=SceneCuts,1,'last'));
    kmin = max(kmin, klastscenecut);
    knextscenecut = SceneCuts(find(n<SceneCuts,1,'first'));
    if ~isempty(knextscenecut)
        kmax = min(kmax, knextscenecut−1);
    end
    %Filter (example of operation 605)
    H = exp( − (k−n).^2 / (2*(l/6*FIRWindow)^2) )';
    H = H/sum(H);
    NewMinF(n) = WindowedMin(k) * H;
    NewMidF(n) = L1Mid(n);
    NewMaxF(n) = WindowedMax(k) * H;
end
```

Figure 7A:
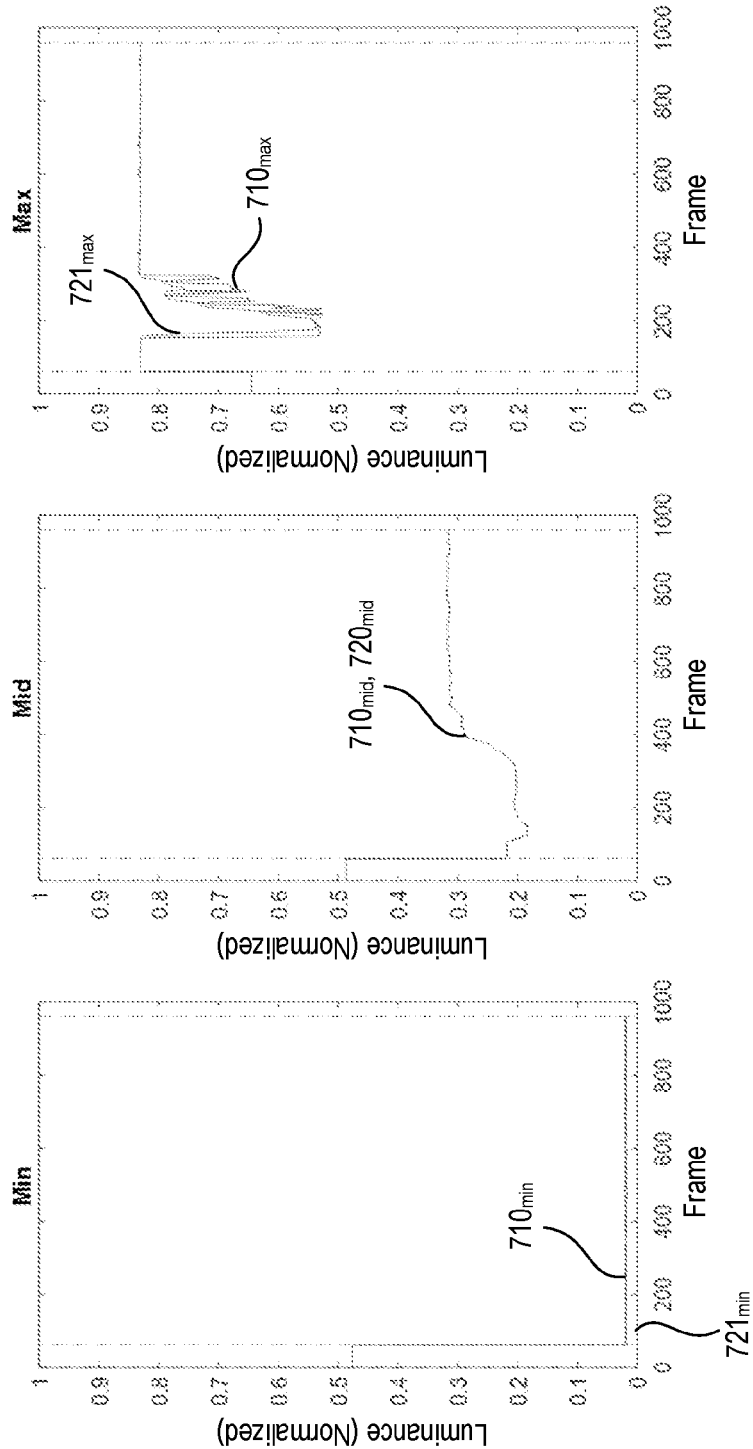
FIGS. 7A-7C respectively illustrate exemplary metadata generated by the method of FIG. 6.
Figure 7B:
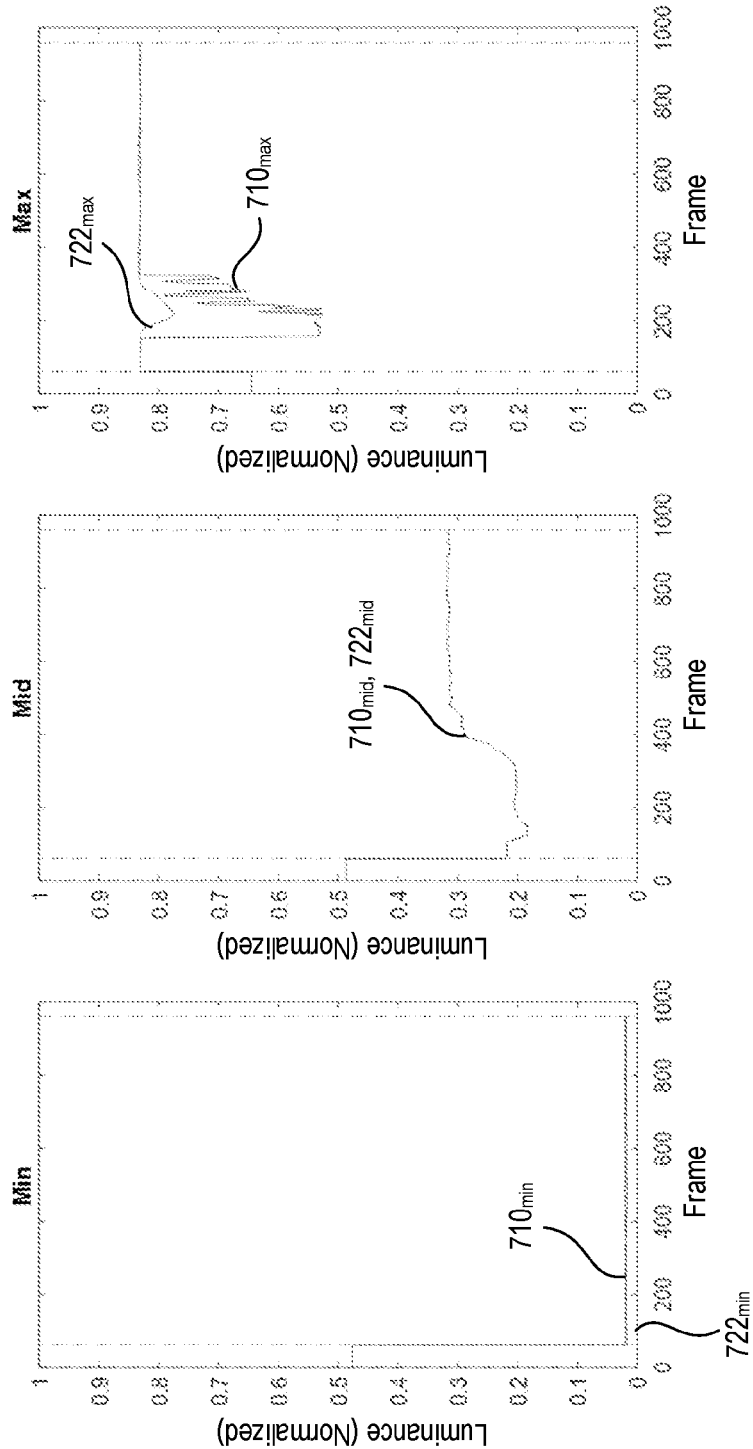
Figure 7C:
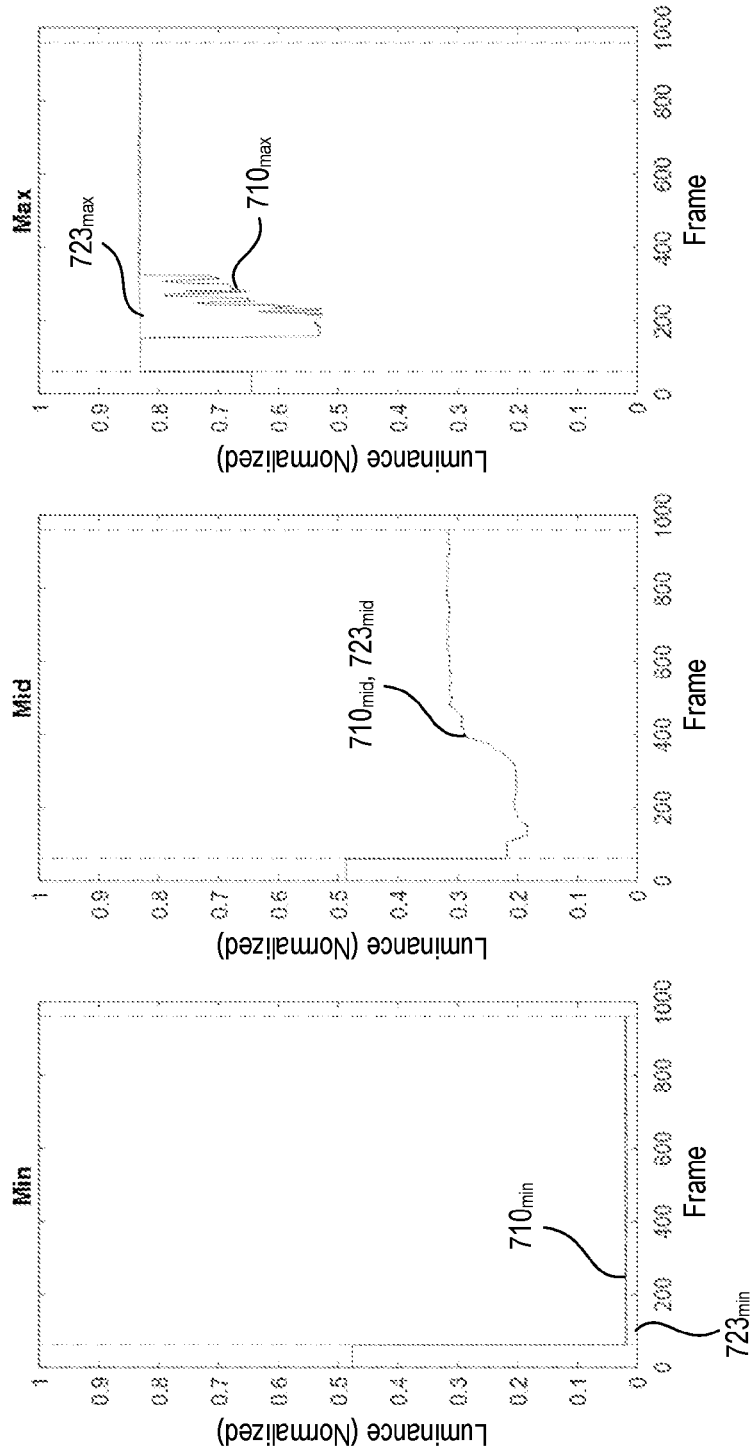

FIGS. 7A-7C illustrates an exemplary output of the above operations for metadata corresponding to the crush, mid, and clip values, for different window lengths. Each graph illustrates a normalized luminance as a function of a frame number. In each of FIGS. 7A-7C, lines $710_{min}$, $710_{mid}$, and $710_{max}$ illustrate the minimum, mean, and maximum luminance values of a given frame, respectively. In FIG. 7A, Lines $721_{min}$, $721_{mid}$, and $721_{max}$ illustrate the values L1min, L1mid, L1max for the given frame calculated according to the above methods with a window length T of 1 seconds. In FIG. 7B, Lines $722_{min}$, $722_{mid}$, and $722_{max}$ illustrate the values L1min, L1mid, L1max for the given frame calculated according to the above methods with a window length T of 4 seconds. In FIG. 7C, Lines $723_{min}$, $723_{mid}$, and $723_{max}$ illustrate the values L1min, L1mid, L1max for the given frame calculated according to the above methods with a window length T of 8 second.

By comparing FIGS. 7A-7C with one another, it can be seen that shorter window lengths result in increased picture quality (e.g., line $721_{max}$ more closely tracks line $710_{max}$); however, longer window lengths result in improved temporal stability (e.g., line $723_{max}$ exhibits a larger degree of variability). In one particular implementation of the present disclosure, the window length is preferably 4 seconds as illustrated in FIG. 7B.

The windowed generation of metadata produces metadata that is an outer envelope of the crush and the clip of a moving window. Compared to the semi-dynamic generation of metadata, it requires more frames to compute but is finite in the number of frames needed to compute metadata for any single frame, unlike the comparative methods described above. By applying a filter twice consecutively, the resulting filter is essentially triple the length of the specified window. The successive operations may be combined into a single operation or flow, for example using the pseudocode illustrated above.

Exemplary Computer System Implementation

Various aspects of the present disclosure may be implemented with a computer system, systems configured in electronic circuitry and components, an integrated circuit (IC) device such as a microcontroller, an FPGA, or another configurable of programmable logic device (PLD), a discrete time or digital signal processor (DSP), an ASIC, and/or an apparatus that includes one or more of such systems, device, and components. The computer and/or IC may perform, control, or execute instructions related to the above-described processes and operations. The computer and/or IC may compute any of a variety of parameters or values that relate to the above-described processes and operations.

Figure 8:
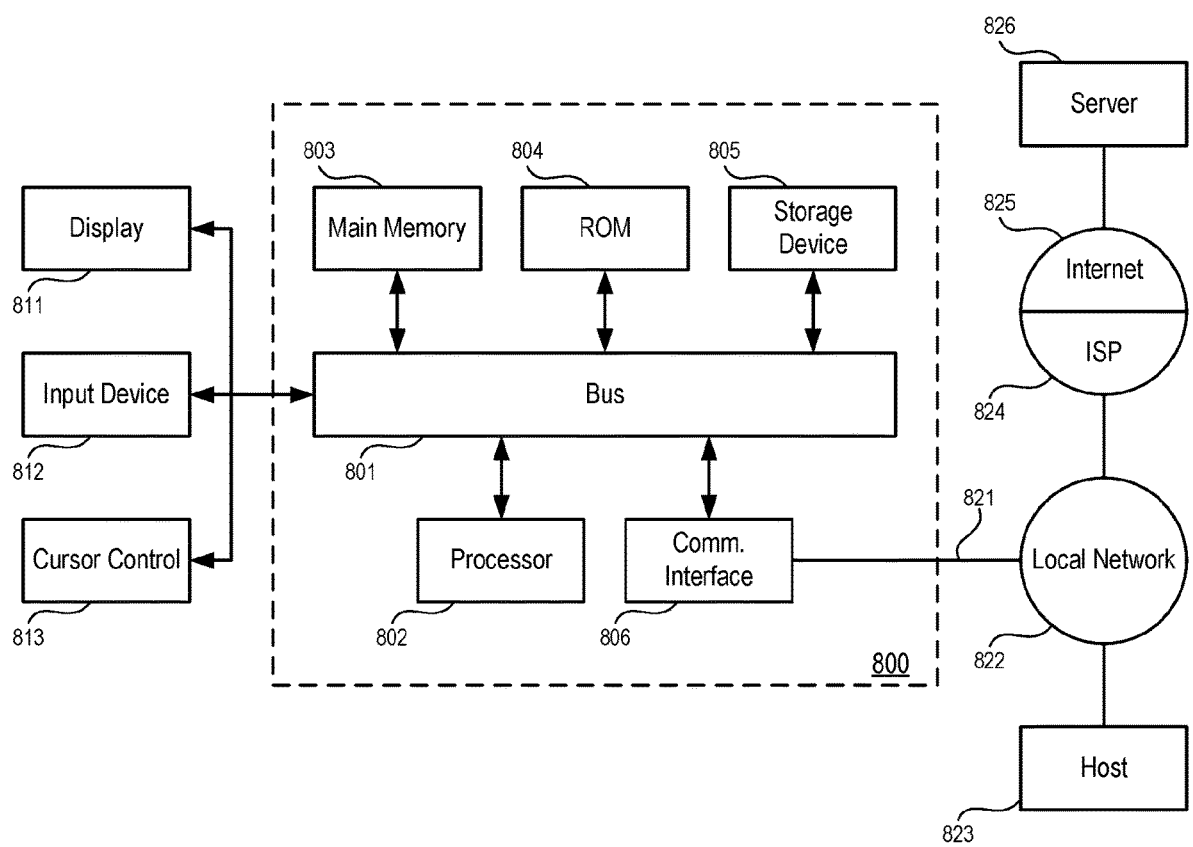
FIG. 8 illustrates an exemplary system in accordance with various aspects of the present disclosure.

FIG. 8 illustrates one example of a computer system 800 in which one or more aspects of the present disclosure may be implemented. As illustrated, the computer system 800 includes a bus 801 or other communication mechanism for communicating information, and a hardware processor 802 coupled with the bus 801 for processing information. The processor 802 may be, for example, a general purpose microprocessor.

The computer system 800 also includes a main memory 803, such as a random access memory (RAM) or other dynamic storage device, coupled to the bus 801 for storing information and instructions to be executed by the processor 802. The main memory 803 also may be used for storing temporary variables or other intermediate information during execution of instructions to be executed by the processor 802. Such instructions, when stored in non-transitory storage media accessible to the processor 802, render the computer system 800 into a special-purpose machine that is customized to perform the operations specified in the instructions.

The computer system 800 further includes a read only memory (ROM) 804 or other static storage device coupled to the bus 801 for storing static information and instructions for the processor 802. A storage device 805, such as a magnetic disk or optical disk, may be provided and coupled to the bus 801 for storing information and instructions. The computer system 800 may be coupled via the bus 801 to a display 811, such as a liquid crystal display, for displaying information to a computer user. An input device 812, including alphanumeric and other keys, is coupled to the bus 801 for communicating information and command selections to the processor 802. The computer system 800 may further be coupled via the bus 801 to a cursor control 813, such as a mouse, a trackball, or cursor direction keys for communicating direction information and command selections to the processor 802 and for controlling cursor movement on the display 811.

The computer system 800 may implement the techniques described herein using customized hard-wired logic, one or more ASICs or FPGAs, firmware and/or program logic which in combination with the computer system causes or programs the computer system 800 to be a special-purpose machine. According to one embodiment, the techniques as described herein are performed by the computer system 800 in response to the processor 802 executing one or more sequences of one or more instructions contained in the main memory 803. Such instructions may be read into the main memory 803 from another storage medium, such as the storage device 805. Execution of the sequences of instructions contained in the main memory 803 causes the processor 802 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage device 805. Volatile media includes dynamic memory, such as the main memory 803. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 801. Transmission media can also take the form of acoustic or light waves, such as those generated during radio-wave and infra-red data communications.

Various forms of media may be involved in carrying one or more sequences of one or more instructions to the processor 802 for execution. For example, the instructions may initially be carried on a magnetic disk or solid state drive of a remote computer. The remote computer can load the instructions into its dynamic memory and send the instructions over a communication line such as coaxial cable, optical fibers, and so on. A communication interface 806 local to the computer system 800 can receive the data on the communication line and appropriate circuitry can place the data on the bus 801. The bus 801 carries the data to the main memory 803, from which the processor 802 retrieves and executes the instructions. The instructions received by the main memory 803 may optionally be stored on the storage device 805 either before or after execution by the processor 802.

The communication interface 806 provides a two-way data communication coupling to a network link 821 that is connected to a local network 822. For example, the communication interface 806 may be an integrated services digital network (ISDN) card, cable modem, satellite modem, or a modem to provide a data communication connection to a corresponding type of telephone line. As another example, the communication interface 806 may be a local area network (LAN) card to provide a data communication connection to a compatible LAN. Wireless links may also be implemented. In any such implementation, the communication interface 806 sends and receives electrical, electromagnetic or optical signals that carry digital data streams representing various types of information.

The network link 821 typically provides data communication through one or more networks to other data devices. For example, the network link 821 may provide a connection through the local network 822 to a host computer 823 or to data equipment operated by an Internet Service Provider (ISP) 824. The ISP 824 in turn provides data communication services through the world wide packet data communication network now commonly referred to as the "Internet" 825. The local network 822 and Internet 825 both use electrical, electromagnetic or optical signals that carry digital data streams. The signals through the various networks and the signals on the network link 821 and through the communication interface 806, which carry the digital data to and from the computer system 800, are example forms of transmission media.

The computer system 800 can send messages and receive data, including program code, through the network(s), the network link 821 and the communication interface 806. In the Internet example, a server 826 might transmit a requested code for an application program through the Internet 825, the ISP 824, the local network 822 and the communication interface 806. The received code may be executed by the processor 802 as it is received, and/or stored in the storage device 805, or other non-volatile storage for later execution.

Applications and Effects

The above aspects of the present disclosure may provide for the generation of metadata that may be used to provide improved video quality, improved temporal stability, low computational requirements, and reduced latency.

Systems, methods, and devices in accordance with the present disclosure may take any one or more of the following configurations.

(1) A method of editing video content, comprising: receiving input video data; converting the input video data to a predetermined format, thereby to generate converted video data; generating a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content, wherein the first metadata value, the second metadata value, and the third metadata value include information used by a decoder to render a decoded image on a display.

(2) The method according to (1), further comprising applying a spatial smoothing operation to the converted video data prior to generating the plurality of initial metadata values.

(3) The method according to (2), wherein the applying the spatial smoothing operation includes subsampling the converted video data.

(4) The method according to (2) or (3), wherein the applying the spatial smoothing operation includes decimating the converted video data to a smaller size.

(5) The method according to any one of (1) to (4) further comprising: outputting a distribution video data including a part of the video data corresponding to the frame, the first metadata value, the second metadata value, and the third metadata value.

(6) The method according to any one of (1) to (5), wherein the first fixed value corresponds to a minimum allowable luminance value of the content, and the second fixed value corresponds to a maximum allowable luminance value of the content.

(7) The method according to any one of (1) to (6), wherein the predetermined format is a Perceptual Quantizer High Dynamic Range format.

(8) A non-transitory computer-readable medium storing instructions that, when executed by a processor of a computer system, cause the computer system to perform operations comprising the method according to any one of (1) to (7).

(9) A video editing system, comprising: a memory; and a processor configured cause the video editing system to: receive input video data, convert the input video data to a predetermined format, thereby to generate converted video data, generate a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content.

(10) The video editing system according to (9), wherein the processor is configured to cause the video editing system to: apply a spatial smoothing operation to the converted video data prior to generating the plurality of initial metadata values.

(11) The video editing system according to (10), wherein the spatial smoothing operation includes subsampling the converted video data.

(12) The video editing system according to (10) or (11), wherein the spatial smoothing operation includes decimating the converted video data to a smaller size.

(13) The video editing system according to any one of (9) to (12), wherein the processor is configured to further cause the video editing system to: output a distribution video data including a part of the video data corresponding to the frame, the first metadata value, the second metadata value, and the third metadata value.

(14) The video editing system according to any one of (9) to (13), wherein the first fixed value corresponds to a minimum allowable luminance value of the content, and the second fixed value corresponds to a maximum allowable luminance value of the content.

(15) The video editing system according to any one of (9) to (14), wherein the predetermined format is a Perceptual Quantizer High Dynamic Range format.

(16) A method of editing video content, comprising: receiving input video data; converting the input video data to a predetermined format, thereby to generate converted video data; generating a first metadata value for a frame of the converted video data, the first metadata value corresponding to an average luminance value of the frame; determining a temporal window including the frame, the temporal window having a predetermined length in time; calculating a maximum metadata range and a minimum metadata range over the temporal window, thereby to generate a first filtered metadata value and a second filtered metadata value; and smoothing the first filtered metadata value and the second filtered metadata value, thereby to generate a first smoothed and filtered metadata value and a second smoothed and filtered metadata value.

(17) The method according to (16), wherein the predetermined length in time is four seconds.

(18) The method according to (16) or (17), wherein the window is configured so as not to cross a scene cut in the input video data.

(19) The method according to any one of (16) to (18), further comprising applying a spatial smoothing operation to the converted video data prior to generating the first metadata value.

(20) A non-transitory computer-readable-medium storing instructions that, when executed by a processor of a computer system, cause the computer system to perform operations comprising the method according to any one of (16) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Various aspects of the present invention may be appreciated from the following enumerated example embodiments (EEEs):

1. A method of editing video content, comprising:
   receiving input video data;
   converting the input video data to a predetermined format, thereby to generate converted video data;
   generating a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content,
   wherein the first metadata value, the second metadata value, and the third metadata value include information used by a decoder to render a decoded image on a display.

2. The method according to EEE 1, further comprising applying a spatial smoothing operation to the converted video data prior to generating the plurality of initial metadata values.

3. The method according to EEE 2, wherein the applying the spatial smoothing operation includes subsampling the converted video data.

4. The method according to EEE 2 or EEE 3, wherein the applying the spatial smoothing operation includes decimating the converted video data to a smaller size.

5. The method according to any one of EEEs 1 to 4, further comprising:
   outputting a distribution video data including a part of the video data corresponding to the frame, the first metadata value, the second metadata value, and the third metadata value.

6. The method according to any one of EEEs 1 to 5, wherein the first fixed value corresponds to a minimum allowable luminance value of the content, and the second fixed value corresponds to a maximum allowable luminance value of the content.

7. The method according to any one of EEEs 1 to 6, wherein the predetermined format is a Perceptual Quantizer High Dynamic Range format.

8. A non-transitory computer-readable medium storing instructions that, when executed by a processor of a computer system, cause the computer system to perform operations comprising the method according to any one of EEEs 1 to 7.

9. A video editing system, comprising:
a memory; and
a processor configured cause the video editing system to:
   receive input video data,
   convert the input video data to a predetermined format, thereby to generate converted video data,
   generate a plurality of initial metadata values for a frame of the converted video data, the plurality of initial metadata values including a first metadata value corresponding to a first fixed value not calculated from a content including the frame, a second metadata value corresponding to an average luminance value of the frame, and a third metadata value corresponding to a second fixed value not calculated from the content.

10. The video editing system according to EEE 9, wherein the processor is configured to cause the video editing system to:
apply a spatial smoothing operation to the converted video data prior to generating the plurality of initial metadata values.

11. The video editing system according to EEE 10, wherein the spatial smoothing operation includes subsampling the converted video data.

12. The video editing system according to EEE 10 or EEE 11, wherein the spatial smoothing operation includes decimating the converted video data to a smaller size.

13. The video editing system according to any one of EEEs 9 to 12, wherein the processor is configured to further cause the video editing system to:
output a distribution video data including a part of the video data corresponding to the frame, the first metadata value, the second metadata value, and the third metadata value.

14. The video editing system according to any one of EEEs 9 to 13, wherein the first fixed value corresponds to a minimum allowable luminance value of the content, and the second fixed value corresponds to a maximum allowable luminance value of the content.

15. The video editing system according to any one of EEEs 9 to 14, wherein the predetermined format is a Perceptual Quantizer High Dynamic Range format.

The invention claimed is:

1. A method of editing video content, comprising:
receiving input video data in a first format;
converting the input video data to a predetermined format different than the first format of the input video data with respect to dynamic range, thereby to generate converted video data; and
generating a plurality of initial metadata values for a frame of the converted video data, wherein generating the plurality of initial metadata values comprises:
   setting a first metadata value equal to a first fixed value wherein the first fixed value is a minimum allowable luminance value of the first format,
   calculating a second metadata value equal to an average luminance value of the frame of the converted video data, and
   setting a third metadata value equal to a second fixed value, wherein the second fixed value is a maximum allowable luminance value of the first format,
wherein the first metadata value, the second metadata value, and the third metadata value include information used by a decoder to render a decoded image on a display.

2. The method according to claim 1, wherein the predetermined format is a Standard Dynamic Range format and the first format is a High Dynamic Range format.

3. The method according to claim 1, further comprising applying a spatial smoothing operation to the converted video data prior to generating the plurality of initial metadata values.

4. The method according to claim 3, wherein the applying the spatial smoothing operation includes subsampling the converted video data.

5. The method according to claim 3, wherein the applying the spatial smoothing operation includes decimating the converted video data to a smaller size.

6. The method according to claim 1, further comprising:
outputting a distribution video data including a part of the converted video data corresponding to the frame, the first metadata value, the second metadata value, and the third metadata value.

7. The method according to claim 1, wherein the predetermined format is a Perceptual Quantizer High Dynamic Range format.

8. A non-transitory computer-readable medium storing instructions that, when executed by a processor of a computer system, cause the computer system to perform operations comprising the method according to claim 1.

9. A video editing system, comprising:
a memory; and
a processor configured to cause the video editing system to:
   receive input video data in a first format,
   convert the input video data to a predetermined format different than the first format of the input video data with respect to dynamic range, thereby to generate converted video data,
   generate a plurality of initial metadata values for a frame of the converted video data, the plurality of initial metadata values including:
   a first metadata value equal to a first fixed value, wherein the first fixed value is set to a minimum allowable luminance value of the first format,
   a second metadata value equal to a calculated average luminance value of the frame of the converted video data,
   and a third metadata value equal to a second fixed value, wherein the second fixed value is set to a maximum allowable luminance value of the first format.

10. The video editing system according to claim 9, wherein the predetermined format is a Standard Dynamic Range format, optionally wherein the input video data is in a High Dynamic Range format.

11. The video editing system according to claim 9, wherein the processor is configured to cause the video editing system to:
apply a spatial smoothing operation to the converted video data prior to generating the plurality of initial metadata values.

12. The video editing system according to claim 11, wherein the spatial smoothing operation includes subsampling the converted video data.

13. The video editing system according to claim 11, wherein the spatial smoothing operation includes decimating the converted video data to a smaller size.

14. The video editing system according to claim 9, wherein the processor is configured to further cause the video editing system to:

output a distribution video data including a part of the converted video data corresponding to the frame, the first metadata value, the second metadata value, and the third metadata value.

15. The video editing system according to claim 9, wherein the predetermined format is a Perceptual Quantizer High Dynamic Range format.

\* \* \* \* \*